(No Model.)

H. WILSON.
COFFEE PERCOLATOR.

No. 530,149. Patented Dec. 4, 1894.

Witnesses:

Inventor.
Horace Wilson

UNITED STATES PATENT OFFICE.

HORACE WILSON, OF INDIAN DIGGINGS, CALIFORNIA.

COFFEE-PERCOLATOR.

SPECIFICATION forming part of Letters Patent No. 530,149, dated December 4, 1894.

Application filed April 21, 1893. Serial No. 471,364. (No model.)

*To all whom it may concern:*

Be it known that I, HORACE WILSON, a citizen of the United States, residing at Indian Diggings, in the county of El Dorado and State of California, have invented a new and useful Improvement in Coffee-Percolators, of which the following is a specification.

My invention relates to improvements in making and clarifying coffee and consists in a detachable percolator provided with a metal rim and a handle journaled therein, and a slotted tube depending on the combination of the cover to sustain the percolator.

The objects of my improvements are—

First. To utilize the entire strength of the coffee. The metal rim inflates the percolator allowing the water to circulate therein through the coffee grounds while steeping thus gaining the object named.

Second. To simplify the mechanism without impairing the efficiency of the objects named, to reduce the cost of manufacture, so that the price of purchase may not retard its use and to increase its efficiency for convenience, economy and durability as a kitchen utensil for every day use.

The mechanism by which I attain these objects is illustrated in the accompanying drawings.

Figure 1:
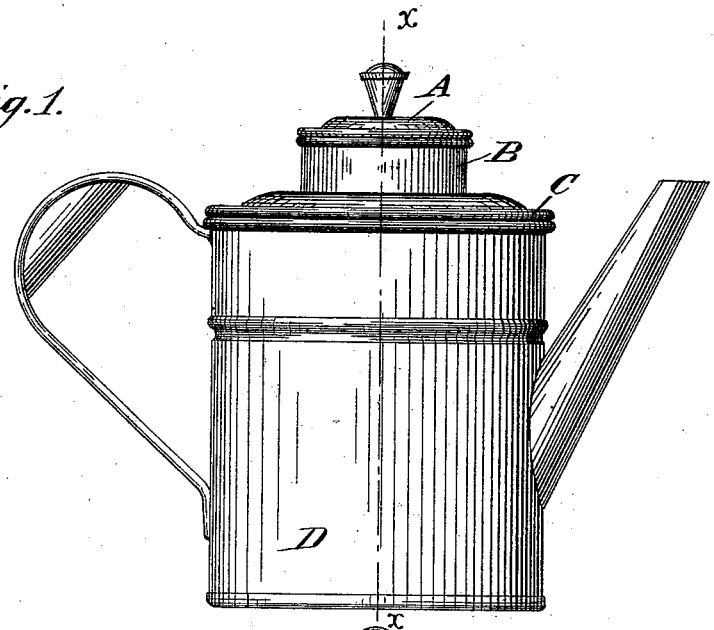
Figure 2:
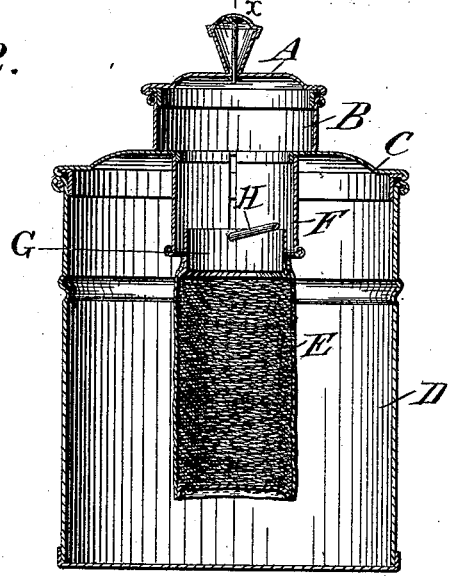

Figure 1 is a perspective view of the coffee pot complete. Fig. 2 is a sectional view through line $x-x$ of Fig. 1.

D is a coffee pot, provided with the usual handle and spout. C is the cover for the same which is provided with a depending slotted tube F and an upstanding rim B. A is the cover for said rim B.

E is a percolator provided with a ring G in which is journaled a handle H the ends of which extend beyond the ring G to form rests for the percolator. The ends of the handle H of the percolator E engage with the slot in depending tube F to sustain the percolator as illustrated in Fig. 2.

By removing cover A, the percolator is lifted from pot D by the handle H through the rim B for the removal of the coffee grounds or for other purposes.

I do not claim as my invention broadly the combination illustrated in Figs. 1, and 2, but What I do claim as my invention, and desire to secure by Letters Patent, is—

In a coffee pot the combination of the cover provided with a depending slotted tube and a percolator provided with a handle journaled therein and extending through and beyond the sides thereof, the ends of the handle engaging with the slot in the tube to sustain the percolator substantially as set forth.

HORACE WILSON.

Witnesses:
PETER ALONZO CLUTE,
ELBRIDGE W. HUEY.